US012630466B2

(12) United States Patent (10) Patent No.: US 12,630,466 B2
Castang Montiel et al. (45) Date of Patent: May 19, 2026

(54) PHOTOLUMINESCENT VITROCERAMIC NANOCRYSTALS BASED ON SILICA-STABILISED ZIRCONIUM, PRODUCTION METHOD THEREOF AND PRODUCT BASED ON THE NANOCRYSTALS, FOR THERMAL BARRIER COATINGS

(71) Applicant: UNIVERSIDAD AUTONOMA DE OCCIDENTE, Valle (CO)

(72) Inventors: Carlos Eduardo Castang Montiel, Cali (CO); Clara Eugenia Goyes Lopez, Cali (CO); Juan Ricardo Vidal Medina, Valle (CO); Lina María Garcia Cruz, Cali (CO); Javier Arturo Jurado Rosero, Cali (CO)

(73) Assignee: UNIVERSIDAD AUTONOMA DE OCCIDENTE, Valle del Cauca (CO)

( * ) Notice: Subject to any disclaimer, the term of this patent is extended or adjusted under 35 U.S.C. 154(b) by 788 days.

(21) Appl. No.: 17/999,672

(22) PCT Filed: Dec. 17, 2021

(86) PCT No.: PCT/CO2021/050007
§ 371 (c)(1),
(2) Date: Nov. 22, 2022

(87) PCT Pub. No.: WO2022/135621
PCT Pub. Date: Jun. 30, 2022

(65) Prior Publication Data
US 2023/0219838 A1 Jul. 13, 2023

(30) Foreign Application Priority Data
Dec. 21, 2020 (CO) ........................ NC2020/0016025

(51) Int. Cl.
C03C 4/12 (2006.01)
C03C 10/00 (2006.01)
C09K 11/77 (2006.01)

(52) U.S. Cl.
CPC ................ *C03C 4/12* (2013.01); *C03C 10/00* (2013.01); *C09K 11/77* (2013.01);
(Continued)

(58) Field of Classification Search
CPC ....... C03C 4/12; C03C 10/00; C03C 2303/26; C03C 2303/52; C09K 11/77; C09K 11/7701
See application file for complete search history.

(56) References Cited

U.S. PATENT DOCUMENTS 7,364,807 B2 4/2008 Boutwell et al.
7,404,877 B2 7/2008 Demaray et al.
(Continued)

FOREIGN PATENT DOCUMENTS

WO 2008118422 A1 10/2008
WO 2014093391 A2 6/2014

OTHER PUBLICATIONS

Abd-Rahman et al, "Enhanced Luminescence in Er3+-doped SiO2—ZrO2 Glass Ceramic Waveguide", 2011 2nd International Conference on Photonics, 2011, pp. 1-3.*
(Continued)

*Primary Examiner* — C Melissa Koslow
(74) *Attorney, Agent, or Firm* — LUCAS & MERCANTI, LLP

(57) ABSTRACT

Photoluminescent vitroceramic nanocrystals based on silica-stabilised zirconium; a method for producing same; and a product based on the nanocrystals, for thermal barrier coatings; a method for obtaining the nanocrystals and a product
(Continued)

with photoluminescent properties and high-temperature structural stability, for thermal coatings.

4 Claims, 13 Drawing Sheets

(52) U.S. Cl.
CPC ...... *C09K 11/7701* (2013.01); *C03C 2203/26* (2013.01); *C03C 2203/52* (2013.01)

(56) References Cited

U.S. PATENT DOCUMENTS

| | | | |
|---|---|---|---|
| 7,927,722 | B2 | 4/2011 | Schlichting et al. |
| 2010/0086790 | A1 | 4/2010 | Schumann et al. |

OTHER PUBLICATIONS

Suhaimi et al, "Effect of Zirconia in Er3+-doped SiO2—ZrO2 for Planar Waveguide Laser", 2012 IEEE #ed International Conference on Photonics, 2012, pp. 10-13.*

Goncalves et al, "Active planar waveguides based on sol-gel ER3+-doped SiO2—ZrO2 for photonic applications: Morphologi-cal, Structural and optical properties", Journ. of Non-Crystalline Solids, 354, (2008) pp. 4846-4851, Sep. 12, 2008.*

N. F. M. Suhaimi, et al., "Effect of Zirconia in Er3+-doped SiO2—ZrO2 for Planar Waveguide Laser," 2012 IEEE 3rd International Conference on Photonics, Pulau Pinang, Malaysia, 2012, pp. 10-13, doi: 10.1109/ICP.2012.6379874.

M. K. Abd-Rahmana, et al., "Enhanced Luminescence in Er3+-doped SiO2—ZrO2 Glass Ceramic Waveguide," 2011 2nd International Conference on Photonics, Kota Kinabalu, Malaysia, 2011, pp. 1-3, doi: 10.1109/ICP.2011.6106869.

S.A. Kamil, et al., "Optical and Structural Properties of Er 3+ -doped SiO 2—ZrO 2 Glass-Ceramic Thin Film," Journal of Physics: Conference Series. 1349. 012035. 10.1088/1742-6596/1349/1/012035.

R.R. Goncalves, et al., "Active planar waveguides based on sol-gel Er3+-doped SiO2—ZrO2 for photonic applications: Morphological, structural and optical properties," Journal of Non-Crystalline Solids, vol. 354, Issues 42-44, 2008, pp. 4846-4851.

Cesar dos Santos Cunha, et al., "NIR luminescent Er3+/Yb3+ co-doped SiO2—ZrO2 nanostructured planar and channel waveguides: Optical and structural properties," Materials Chemistry and Physics, 2012, v.136, n.1, p. 120-129.

International Search Report for corresponding application PCT/CO2021/050007 dated Apr. 8, 2022 and English translation (5 pages).

* cited by examiner

PHOTOLUMINESCENT VITROCERAMIC NANOCRYSTALS BASED ON SILICA-STABILISED ZIRCONIUM, PRODUCTION METHOD THEREOF AND PRODUCT BASED ON THE NANOCRYSTALS, FOR THERMAL BARRIER COATINGS

CROSS REFERENCE TO RELATED APPLICATION

This Application is a 371 of PCT/CO2021/050007 filed on Dec. 17, 2021, which claims priority of Colombian Application No. NC2020/0016025 filed Dec. 21, 2020, each of which are incorporated herein by reference.

TECHNICAL FIELD

The present invention relates to the technologies of intelligent materials for thermal insulation of metallic surfaces.

PRIOR ART

Nanotechnology has played a very important role in the development of new materials with characteristics that are typical of the material at that scale. Nanometric-scale materials are increasingly revolutionizing detection and control capabilities in certain processes that can be vital for the operation of equipment, process control and even the lives of people, for example, in applications at high temperatures and in the manufacture of environmental sensors, among others.

Glass ceramic materials are of great interest since they can be applied in various fields, one of which is the control of operational variables in thermal systems, for example, the control of the surface temperature of materials that are subjected to high temperatures, such that, for example, the energy efficiency and real-time control of the energy performance of a thermomechanical system are typical applications.

Technologies for the formation of coatings are known in patents, for example, U.S. Pat. No. 7,927,722 which refers to a process for the formation of a coating on a substrate in mechanical applications, wherein the process comprises providing a first zirconia composition that is stabilized by means of a rare earth oxide in powder form to generate a coating and corresponds to a composition that contains at least one rare earth oxide, such as gadolinium oxide (gadolinia), yttrium oxide (yttria) and zirconium oxide (zirconia), present at least a concentration of 5.0% of the total weight. When used in the first composition, zirconia exerts the balance of the powder composition. The first powder is mechanically mixed with a second powder, which may be selected from the group consisting of yttria-stabilized zirconia, cerium-stabilized zirconia, alumina, chrome-alumina, rare-earth-stabilized zirconia, and mixtures thereof. The rare earth oxide(s), when used, may be present in an amount of 10 to 80% by weight.

However, U.S. Pat. No. 7,404,877 refers to a thermal barrier layer comprised of zirconium or a zirconium alloy, especially a layer composed of zirconia or an alloy of zirconia with silica that has improved thermal and barrier properties, wherein said layer of zirconia could be deposited with a fraction of its zirconia in a metallic state. Such a fraction, particularly if very low and at the silicon interface, would act to nucleate silicon crystal grains during the excimer laser melting-recrystallization phase. The invention also teaches a method for obtaining a layer, wherein the layer is formed by mixing between 8 and 12% zirconium powder with yttria powder using isostatic pressing of the mixed powder and also includes mixing metallic zirconium with 8 to 12% metallic yttrium powder; and performing hot isostatic pressing of the mixed powder.

U.S. Pat. No. 7,364,807 disclosed an article comprising a substrate composed of a material containing silicon; an environmental barrier coating (EBC) that coats the substrate; and a thermal barrier coating (TBC) over the environmental barrier coating, said thermal barrier coating comprising a compound consisting essentially of a rhombohedral phase wherein the compound has the formula $A_4B_3O_{12}$, where A comprises at least one rare earth element; and B is selected from the group consisting of Zr, Hf and mixtures thereof, and the thermal barrier coating (TBC) comprises a main constituent part and a stabilizing part, said stabilizing part of said TBC comprising an oxide of said element of rare earth A and wherein the rare earth stabilizer element of A is selected from the group comprised of at least one of: Yb, Ho, Er, Tm, Lu and mixtures thereof.

For its part, document US2010/086790 teaches a layer system that includes a substrate on which a first layer is disposed. The first layer includes a thermographic material that is a pyrochlore phase doped with at least one rare earth material. The rare earth material is selected from the group comprised of europium, terbium, erbium, dysprosium, samarium, holmium, praseodymium, ytterbium, neodymium and thulium. A method for a layer system is also provided, where the system comprises a metal bonding layer that is disposed between the substrate and the first layer. The metal bonding layer advantageously consists of an alloy MCrAlX, where M stands for a metal, in particular, iron (Fe), nickel (Ni) or cobalt (Co), and X represents at least one rare earth element, yttrium (Y) or silicon (Si). The MCrAlX alloy advantageously consists of 24-26% by weight of cobalt, 16 to 18% by weight of chromium, 9.5 to 11% by weight of aluminum, 0.3 to 0.5% by weight of yttrium and 0.5 to 2.0% by weight of rhenium, the balance being nickel.

The PCT application WO2014/093391 describes ceramic compositions that have a dispersion of nanoparticles and methods for the manufacture thereof. In one example, a method of forming a composition having a dispersion of nanoparticles therein includes forming a mixture of semiconductor nanoparticles and ceramic precursor molecules. A ceramic matrix is formed from the ceramic precursor molecules wherein said matrix includes a dispersion of the semiconductor nanoparticles therein. In another example, a composition includes a medium comprising ceramic precursor molecules, wherein the medium is a liquid or gel at 25° C., in which a plurality of semiconducting nanoparticles are suspended.

Finally, PCT application WO2008/118422 proposes nanocrystalline forms of metal oxides, including binary metal oxide, perovskite-type metal oxides and complex metal oxides, including doped metal oxides. Methods of preparing the nanocrystals are also provided. Nanocrystals, including uncoated metal oxide nanocrystals, can be dispersed in a liquid to provide dispersions that are stable and do not precipitate over a period of time ranging from hours to months. Also provided are methods of preparing the dispersions and methods of using the dispersions to form films which may include an organic, inorganic, or mixed matrix. The films may be substantially free of all organic materials. The films can be used as coatings or can be used as dielectric layers in a variety of electronic applications, for example as a dielectric material for a supercapacitor which may include a mesoporous material.

From the state of the art, it is evident that there is a need to provide a mixture of glass and ceramic in the same material or powder in the form of photoluminescent glass ceramic nanocrystals based on zirconia stabilized with silicon oxide to complement applications such as thermal barrier coatings. In this sense, the present invention makes a significant contribution to the state of the art since nanocrystals as a powder product and a production process thereof for various commercial technological applications are disclosed, for example, to deposit on metallic materials by means of techniques of implantation of ceramic powders, for example, plasma or thermal spray. They can also be applied as additives in micro or millimetric materials to confer unique photonic properties.

As mentioned above, the present invention can be applied in various fields, especially to fields directed to the control of operational variables in thermal systems, for example, the control of surface temperature and the performance of materials that are subjected to high temperatures, which depend on the energy efficiency thereof. In addition, the present invention is also directed to the application of this material or powder (nanocrystals) for real-time control of the energy performance of a thermomechanical system, due to the fact that the optical properties of the material enable a determination as to whether there is some kind of internal change of the structure thereof due to thermal or mechanical fatigue of the thermal barrier coating.

Figure 11:
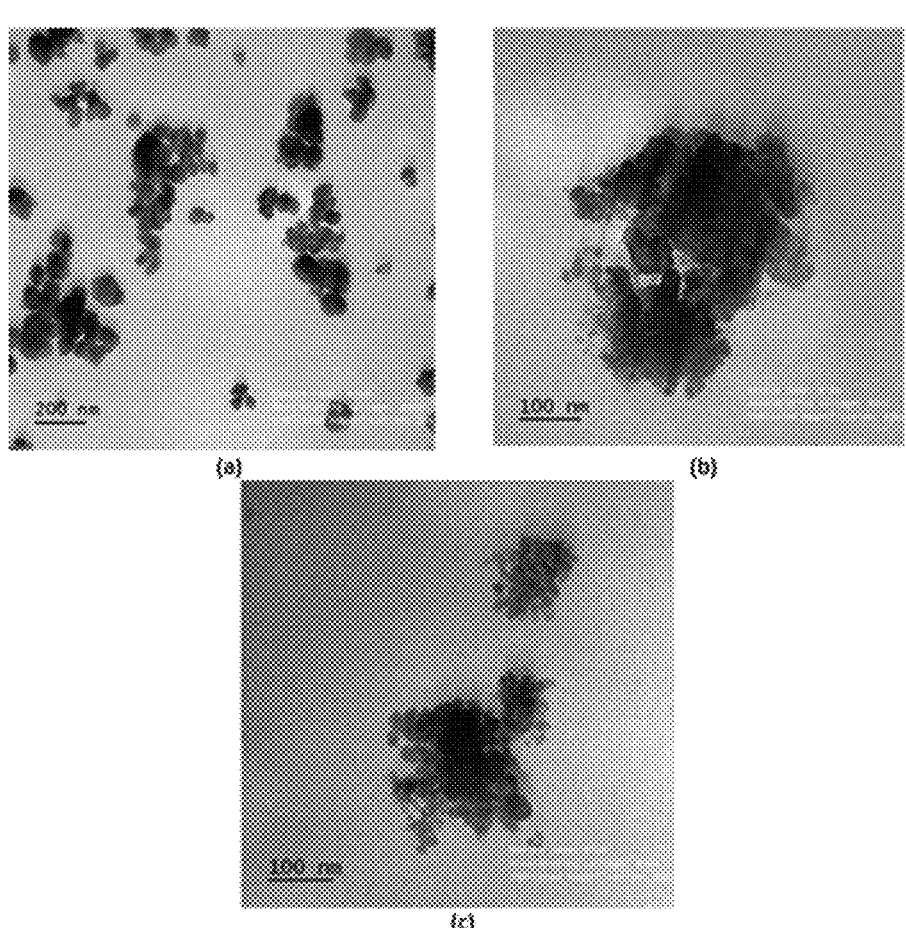
FIG. 11 illustrates TEM images of three samples, in the first (FIG. 11-*a*) only $ZrO_2$ is doped with Er, then $SiO_2$—

$ZrO_2$ (FIG. 11-*b*) is without the doping material, finally there are images of $SiO_2$—$ZrO_2$ doped with Er (FIG. 11-*c*).

Figure 12:
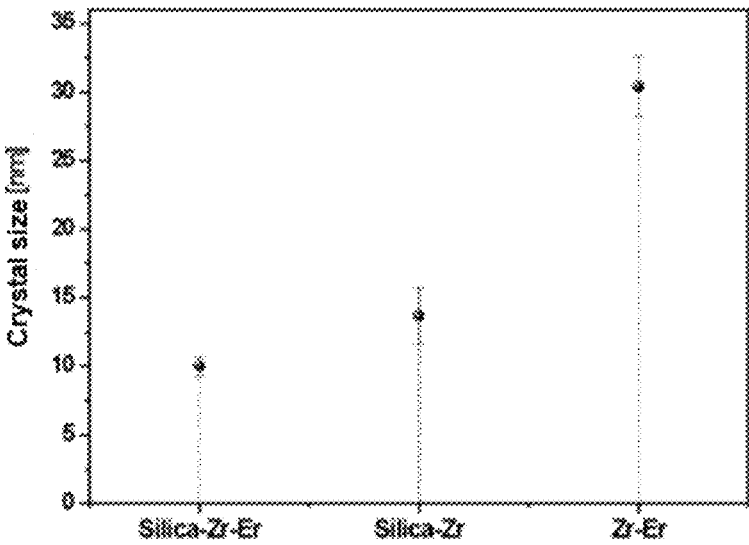

FIG. 12 illustrates an analysis of nanocrystal images indicating that the crystal size for nanocrystals according to the present invention is approximately 10 nm.

SUMMARY OF THE INVENTION

The present invention refers to photoluminescent glass ceramic nanocrystals based on silica-stabilized zirconia, a process for their production and a product based on said nanocrystals for thermal barrier coatings. Also, it refers to the process for obtaining said nanocrystals and the product with photoluminescent properties and thermal coatings which are structurally stable in high temperature conditions.

DETAILED DESCRIPTION OF THE INVENTION

In a first embodiment, the present invention refers to a product in the form of photoluminescent glass ceramic nanocrystals based on zirconia stabilized with silicon oxide, where the material consists of a ratio of 90% $ZrO_2$ and 10% $SiO_2$ obtained from a technique known as the sol-gel method doped with a rare earth element such as Erbium (Er).

Figure 1:
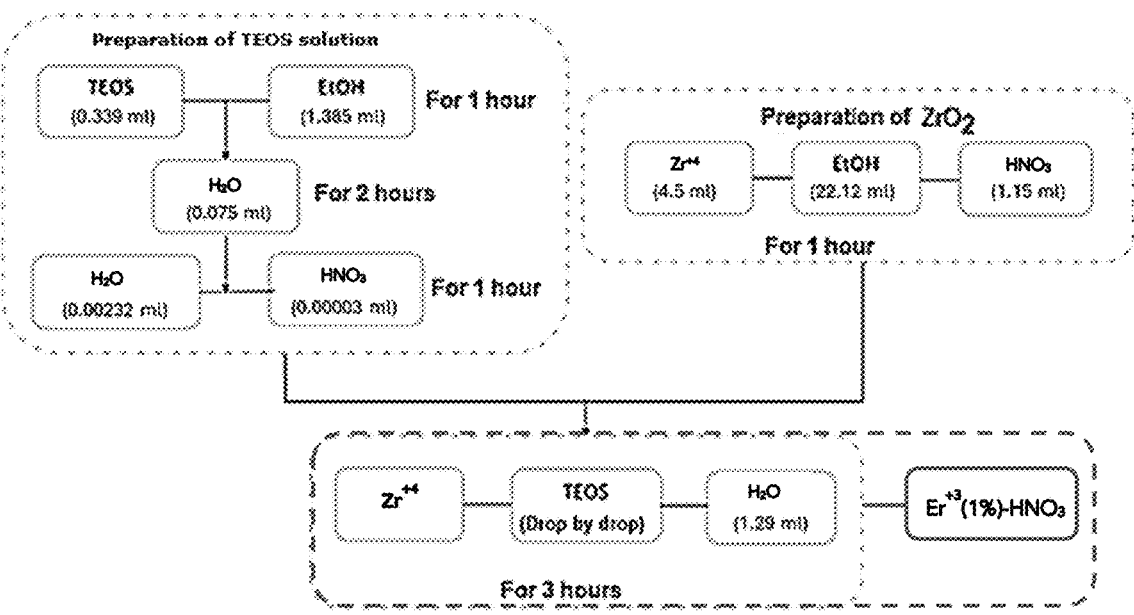
FIG. 1 illustrates a diagram of the process according to the present invention where an example of amounts of the reagents and mixing times for the composition 90-10 ($ZrO_2$—$SiO_2$) is exhibited.
Figure 2:
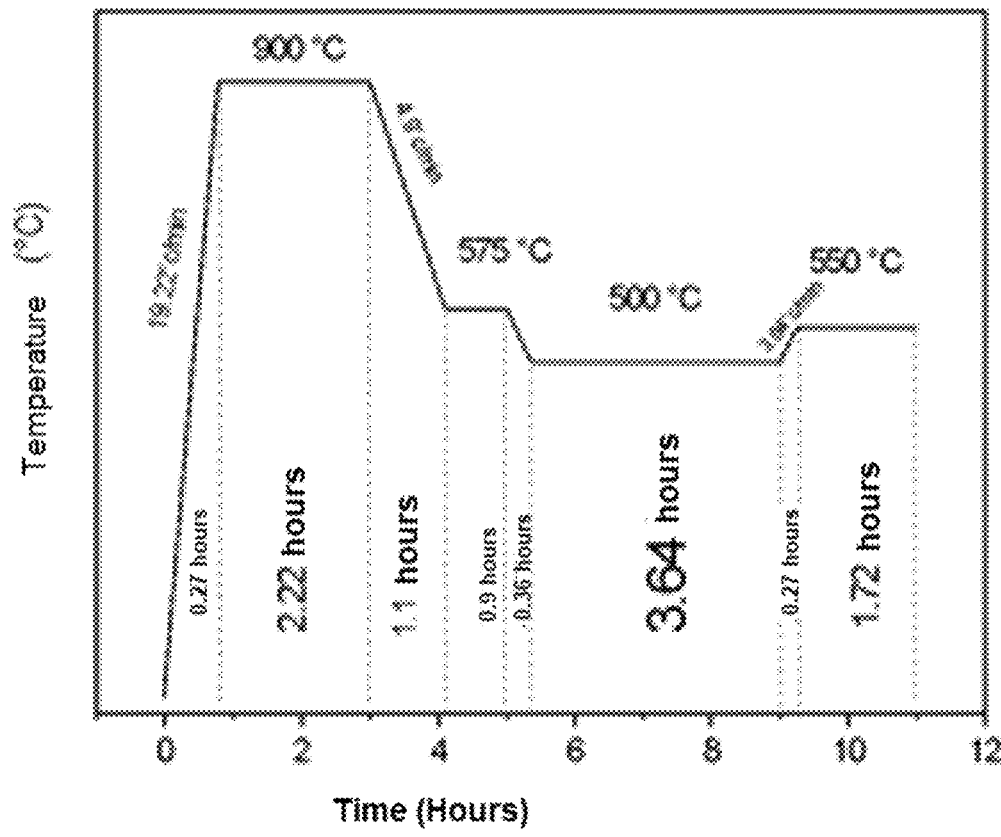
FIG. 2 illustrates the thermal scheme implemented on the glass ceramic samples according to the process of the present invention.

In a second embodiment, the present invention refers to the production process of said nanocrystals, where the process comprises the steps of:

a) Preparation of the precursor of $SiO_2$ (TEOS). See FIG. 1;

b) Preparation of $ZrO_2$, See FIG. 1;

c) Mixture of the products obtained in steps a) and b) to form $SiO_2$—$ZrO_2$, See FIG. 1;

d) Add a mixture of Erbium at a ratio of 1% to step c) where the erbium is in $HNO_3$ solution; See FIG. 1;

e) Agitate the mixture obtained in step d) for a period of 10 to 20 hours, preferably 16 hours;

f) Deposit the mixture in a platinum crucible-type container for thermal treatment; and g) Thermally treat the mixture in the crucible-type container in a furnace or muffle with a heating profile whereat the temperature)($T°$) is increased from room temperature (18 to 25° C.) to 900° C. at a rate of 18 to 20° C./minute, preferably at 19.2° C./min for a period of 0.5 to 0.8 hours, preferably for a period of 0.77 hours, once the temperature of 900° C. is reached, said temperature is maintained for a period of 1 to 2.5 hours, preferably for 2.22 hours, after which a decrease in temperature from 900° C. to 575° C. is performed at a rate of 4 to 5° C./min, preferably at a rate of 4.9° C./min over 0.9 to 1.5 hours, preferably over 1.1 hours. The temperature of 575° C. is then maintained for a period of 0.5 to 1.0 hours, preferably 0.9 hours, after this time, a new decrease in temperature is performed to 500° C. at a rate equal to 4 to 5° C./minute over a period 0.1 to 0.5 hours, preferably 0.3 hours. The temperature of 500° C. is maintained for a period of 2 to 4 hours, preferably 3 hours, more preferably 3.6 hours, after which the temperature is raised to 550° C. at a rate of 3 to 4° C./min over 0.2 to 0.4 hours, preferably 0.3 hours and said temperature is maintained for a period of 1 to 3 hours, preferably 1.72 hours. This thermal treatment can be carried out in a total of 10 to 12 hours, preferably over 11 hours. This treatment is represented in FIG. 2.

In step a), the preparation of the precursor of $SiO_2$ (TEOS solution), the mixture of TEOS is made using a primary alcohol, such as, for example, alcohols from C1 to C4, such as methanol (MeOH), ethanol (EtOH), propanol, etc., in a ratio of 0.1:15.5 (TEOS:alcohol) with constant stirring for 1 hour, then distilled water is added with a mixture between the range of TEOS:Water of 0.1:2.8 for two hours. An inorganic acid such as nitric acid ($HNO_3$) or hydrochloric acid (HCl) and water are then added in a TEOS:acid:water mixture ratio of 0.1:0.0005:2.8 with constant stirring for 1 hour. This stage is carried out at room temperature (18-25° C.) and atmospheric pressure.

Stage b) consists in the preparation of $ZrO_2$, alcohol and acid are added to a zirconium solution ($Zr^{+4}$), for example EtOH and acid, for example nitric acid ($HNO_3$) or hydrochloric acid (HCl) in the proportions of 0.9:24.5:1.8 zirconium:alcohol; acid solution and stirred at room temperature (18-25° C.) and at atmospheric pressure for a period of 1 hour. The source of zirconium for the process of the present invention may be zirconium propoxide $Zr(C3H_7O)_4$ and zirconyl chloride $ZrOCl_2$.

In step c), the TEOS solution obtained in step a) is added dropwise to the $ZrO_2$ solution prepared in step b), and water is also added, maintaining constant stirring for 3 hours at normal temperature and pressure conditions.

The invention also includes photoluminescent glass ceramic nanocrystals based on silica-stabilized zirconia obtained by the process according to the present invention, where the nanocrystals are a product applicable to thermal barrier coatings and are characterized by bands $2\theta$ at 30.1, 34.6, 35.1, 42.9, 50.1, 50.5, 59.3, 60.0, 73.0, 74.3, 82.2, and 84.9. Nanocrystals have sizes between 7.5 and 12.5 nanometers.

In a third embodiment, the invention refers to a product with photoluminescent properties which is structurally stable at high temperature conditions, wherein the material consists of nanocrystals comprising zirconium oxide ($ZrO_2$) mixed with silicon oxide ($SiO_2$) and doped with erbium ions (Er), where the nanocrystals are silica-stabilized zirconia-based photoluminescent glass ceramics obtained by the process according to the present invention, where the crystals are characterized by bands $2\theta$ at 30.1, 34.6, 35.1, 42.9, 50.1, 50.5, 59.3, 60.0, 73.0, 74.3, 82.2 and 84.9. The nanocrystals have sizes between 7.5 and 12.5 nanometers. The inputs and reagents for its production are shown in Table 1.

TABLE 1

| Reagents used for the preparation of materials. | |
| --- | --- |
| Component | Distributor |
| TEOS | Merck |
| H2O | Amresco |
| HNO3 | Burdick & Jackson |
| ZrOCl2 | Merck |
| Er2O3 | Sigma-Aldrich |

The compositions used in the working example shown in FIG. 1 for the preparation of the 90-10 concentration mixture are represented in Table 2.

TABLE 2

| Quantities of reagents for the mixture 90-10 ZrO2—SiO2 (90-10) | | | | |
| --- | --- | --- | --- | --- |
| | Molar Ratio | Moles | ml | Factor = 65.3 |
| TEOS | | | | |
| Si | — | 0.1 | 22.16 | 0.339 | ml |
| EtOH/Si | 15.5 | 1.55 | 90.47 | 1.385 | ml |

TABLE 2-continued

| Quantities of reagents for the mixture 90-10 ZrO2—SiO2 (90-10) | | | | |
| --- | --- | --- | --- | --- |
| | Molar Ratio | Moles | ml | Factor = 65.3 |
| H2O/Si | 2.8 | 0.28 | 5.05 | 0.077 | ml |
| H2O initial | | — | 4.90 | 0.075 | ml |
| H2O final | | — | 0.15164 | 0.00232 | ml |
| HNO3/Si | 0.0005 | 0.00005 | 0.00209 | 0.00003 | ml |
| Zirconium propoxide | | | | |
| Zr | | 0.9 | 293.64 | 4.50 | ml |
| EtOH/Zr | 27.5 | 24.75 | 1444.61 | 22.12 | ml |
| HNO3/Zr | 2 | 1.8 | 75.12 | 1.15 | ml |
| Mixture | | | | |
| H2O/Zr | 5.2 | 4.68 | 84.49 | 1.29 | ml |

The molar ratio for the mixture of the reagents is presented in Table 3:

TABLE 3

| Molar ratio for the mixture of reactants. | |
| --- | --- |
| Specimen (TEOS:ZrClO2) | Molar Relationship |
| EtOH:TEOS:H2O:HNO3 | (15.5:0.1:2.8:0.0005) |
| ZrClO2:EtOH | (0.9:24.75) |
| Er2O3 | 1% |

Figure 3:
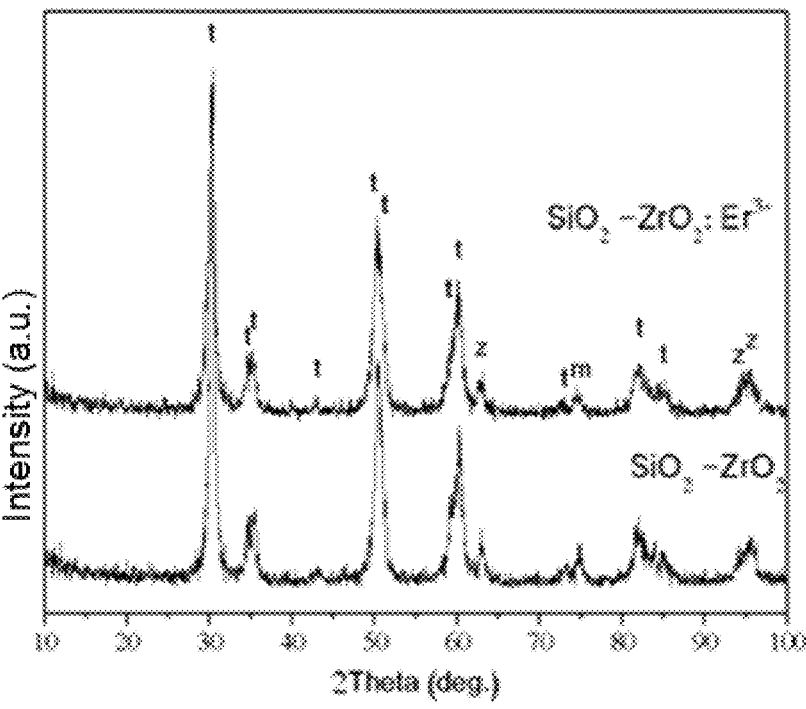
FIG. 3 illustrates an XRD spectrum of the $SiO_2$—$ZrO_2$ product without and with erbium (Er) doping obtained according to the present invention.
Figure 4:
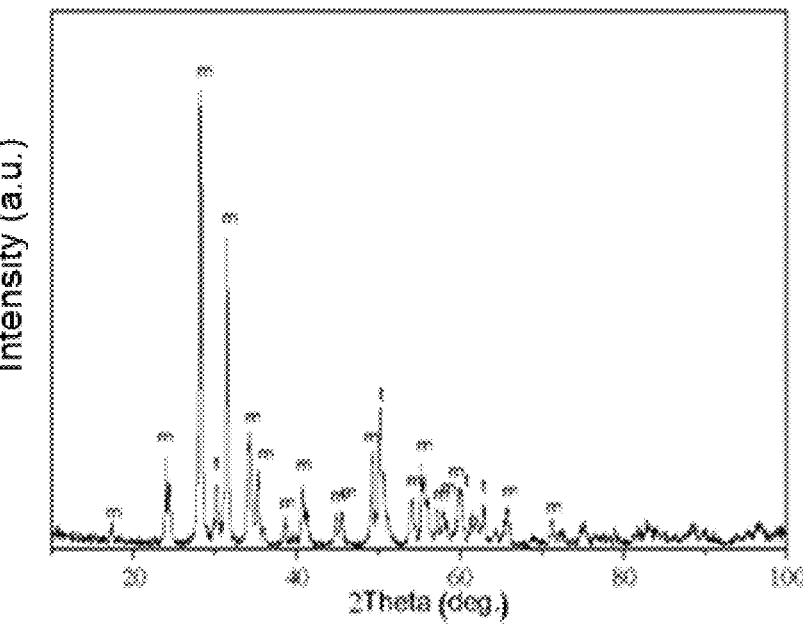
FIG. 4 illustrates an XRD spectrum of a $ZrO_2$-only sample.

The material obtained was characterized from the structural point of view using X-Ray Diffraction (XRD), having as a result that the $SiO_2$—$ZrO_2$—Er glass ceramic presents an almost totally tetragonal structure, as shown in FIG. 3. This figure includes the result of the glass ceramic without doping with Er for comparison. The XRD spectra are similar, which indicates that the inclusion of $SiO_2$ in the proportions of the present invention generates a stabilization of the tetragonal phase at room temperature. FIG. 4 represents the material without $SiO_2$, that is, only $ZrO_2$ doped with Er, and a completely monoclinic structure is shown, which confirms the stabilization effect generated by $SiO_2$ in the $ZrO_2$ structure. This stabilization of the tetragonal phase is what was sought in numerous investigations of materials for applications in thermal barrier coatings (TBC), so that, when the temperature changes, a volumetric change of $ZrO_2$ is not generated.

Figure 5:
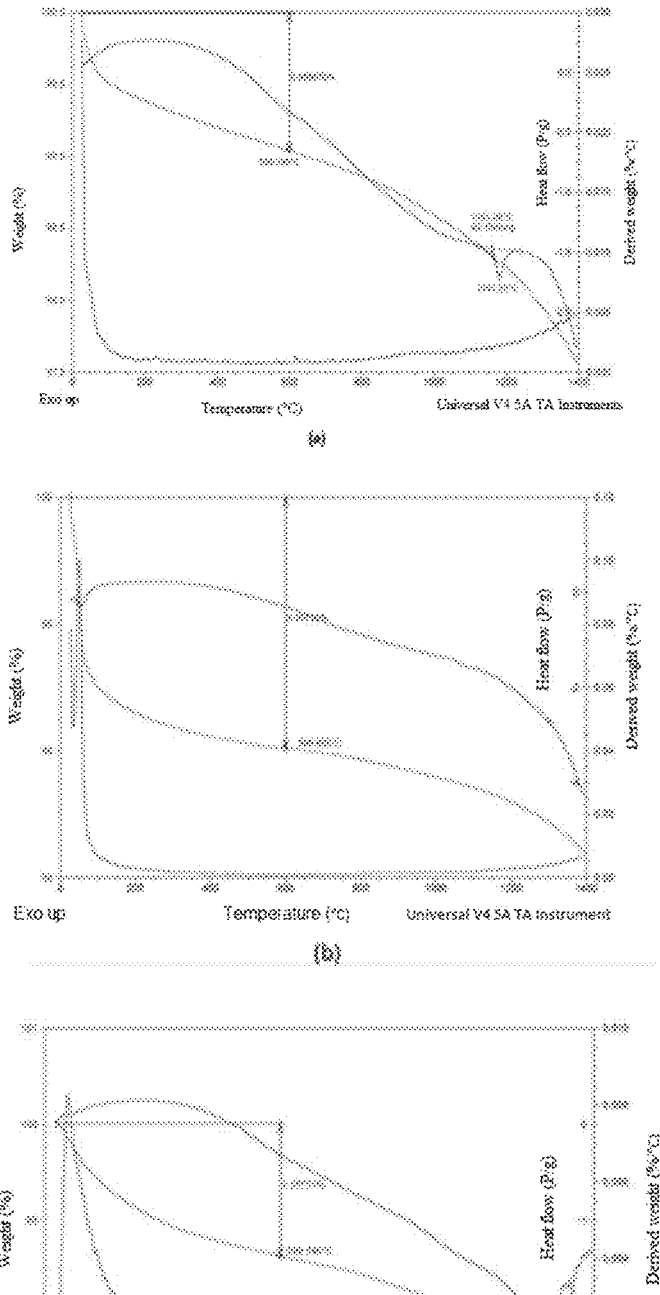
FIG. 5 illustrates the TGA and DSC results of the samples (a) $ZrO_2$—Er, (b) $SiO_2$—$ZrO_2$ and (c) $SiO_2$—$ZrO_2$—Er.

The XRD information is confirmed by the Differential Scanning calorimetry test and thermogravimetric analysis (DSC and TGA) performed on the samples. FIG. 5 represents the DSC and TGA results where it can be seen that the $ZrO_2$—Er sample, FIG. 5-a, exhibits the typical tetragonal ↔ monoclinic phase change at 1181° C. With the inclusion of $SiO_2$, a phase change is not visible, especially in the sample doped with Er (FIG. 5-b), which means that the material does not present the tetragonal ↔ monoclinic transformation, maintaining this phase tetragonal at room temperature.

Figure 6:
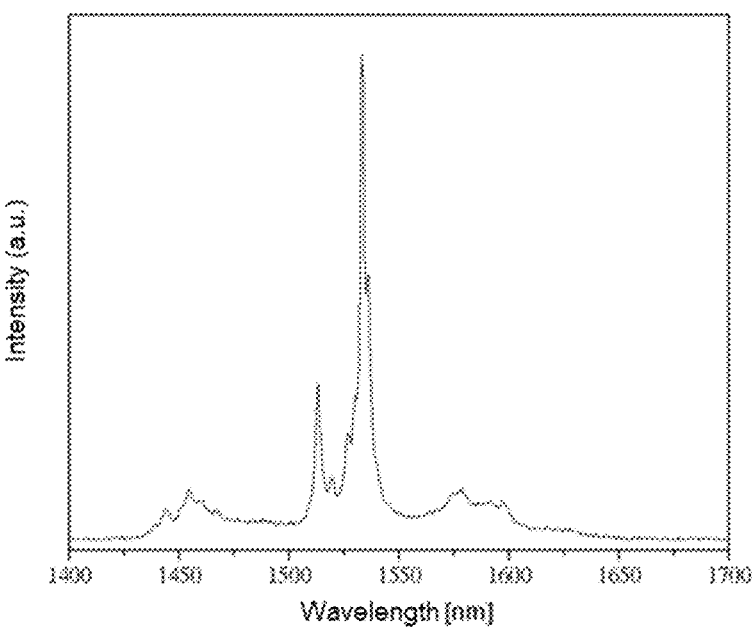
FIG. 6 illustrates a photoluminescence spectrum of the $SiO_2$—$ZrO_2$—$Er^{3+}$ glass ceramic nanocrystals of the present invention.
Figure 6A:
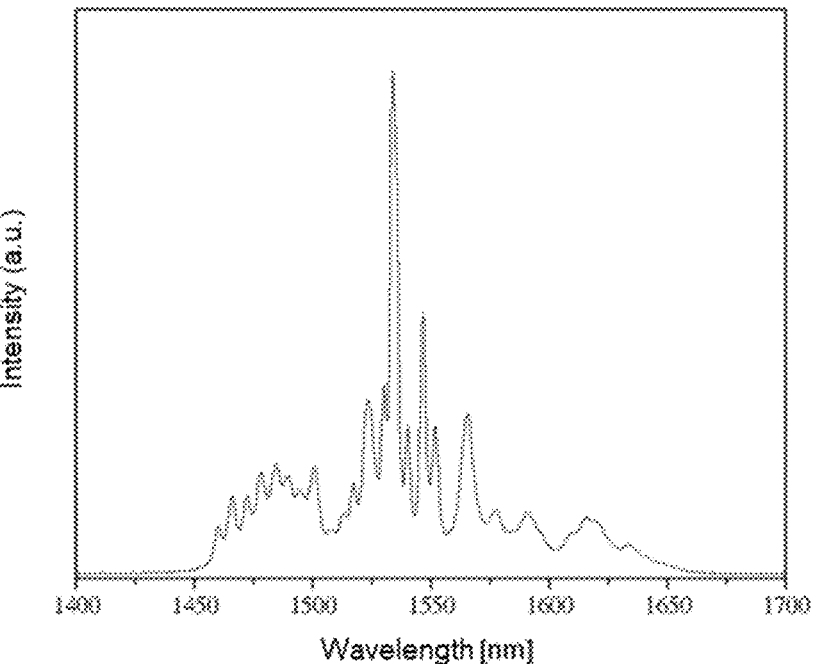
FIG. 6A illustrates a photoluminescence Spectrum of a $ZrO_2$—$Er^{3+}$ sample.

Although so far, results have been presented that prove the stabilization of the tetragonal phase of $ZrO_2$ with the inclusion of $SiO_2$ and erbium, and the effect generated by this inclusion on the optical properties of the material is presented below. These properties are only visible in those samples wherein the erbium was incorporated. FIGS. 6 and 6A demonstrate the photoluminescence of the samples doped with erbium, $ZrO_2$ and $SiO_2$—$ZrO_2$ respectively, in a wavelength range between 1400 and 1700 nm. This photoluminescence was obtained using a 488 nm laser as the excitation source.

Another of the characteristics of the product obtained by means of the process according to the present invention is observed in FIG. 6, which represents the most important results for new applications of this developed material, since it allows the samples to have an emission in the near infrared, with a photoluminescence in the infrared at 1533 nm, enabling passage of the emission through the thermal barrier and detection from the outside by spectroscopy equipment. The assertion that the emission can cross the thermal barrier is because absorption by zirconia-based materials is only possible in the ultraviolet range and part of the visible range, in particular, by the most commercial known Zirconia when stabilized with Yttria ($Y_2O_3$—$ZrO_2$) (FIG. 6a). This has been one of the problems where much effort has been exerted in the development of materials for application in photoluminescent thermography of thermal barriers, or the incorporation of interlayers in the barrier that allow diagnosing the energy performance or detachment of some part of the ceramic protective layer. By depositing the material of the invention in the form of an internal interlayer, irradiation of the barrier is enabled with a visible emission laser from the outside, and then the detection of the fluorescence generated in the material due to the effect of this radiation-material interaction is enabled from the outside with a near-infrared spectrophotometer.

Figure 7:
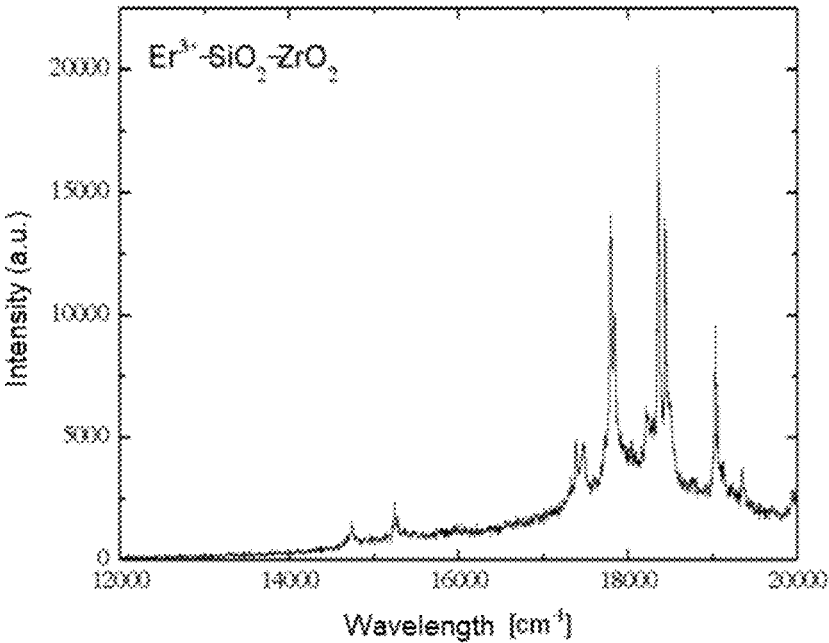
FIG. 7 illustrates a VIS photoluminescence spectrum of a sample of the $SiO_2$—$ZrO_2$—$Er^{3+}$ glass ceramic nanocrystals of the present invention.

FIG. 7 represents the luminescence properties of the nanocrystals according to the present invention at other wavelengths in the visible range.

Figure 8:
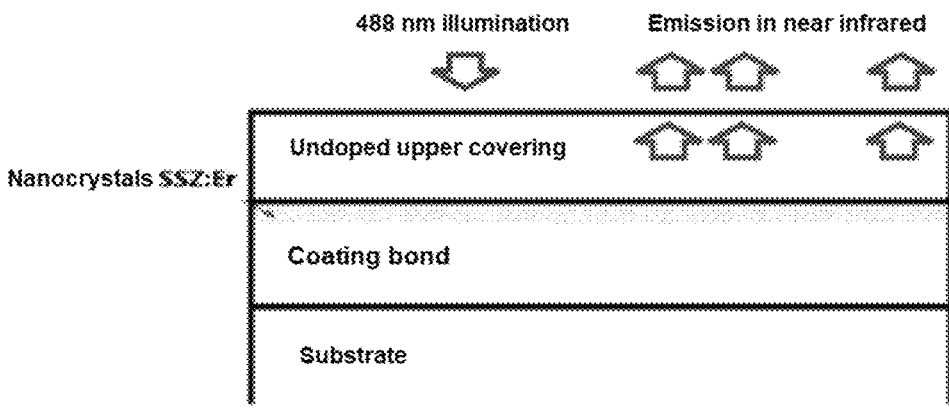
FIG. 8 illustrates a possible application of a thermal barrier coating with the product of the present invention that self-indicates delamination, through the application of $SiO_2$—$ZrO_2$ as a top-coat and an interlayer of Si nanocrystals of $SiO_2$—$ZrO_2$—$Er^{3+}$ according to the invention.

FIG. 8 is a schematic representation of a possible application of the nanocrystal product according to the present invention, representing a configuration that includes a top-coat that works at high temperatures and the photoluminescent nanocrystals of $SiO_2$—$ZrO_2$—Er according to the invention, deposited between the bond-coat and the top-coat. This converts the application into a system that auto-indicates top-coat delamination, preventing the substrate from being exposed to high temperatures and causing system damage. The emission received from the delaminated areas is more intense than in the non-delaminated areas, which enables monitoring of the system from the outside. Therefore, the present invention includes the application of nanocrystals in a TBC that uses materials, especially $ZrO_2$, stabilized with any ceramic oxide ($Al_2O_3$, $CeO_2$, $TiO_2$, $ThO_2$, etc.). As for the bond-coat material, NiCrAlY, $Al_2O_3$ or any other ceramic material can be used.

Figure 9:
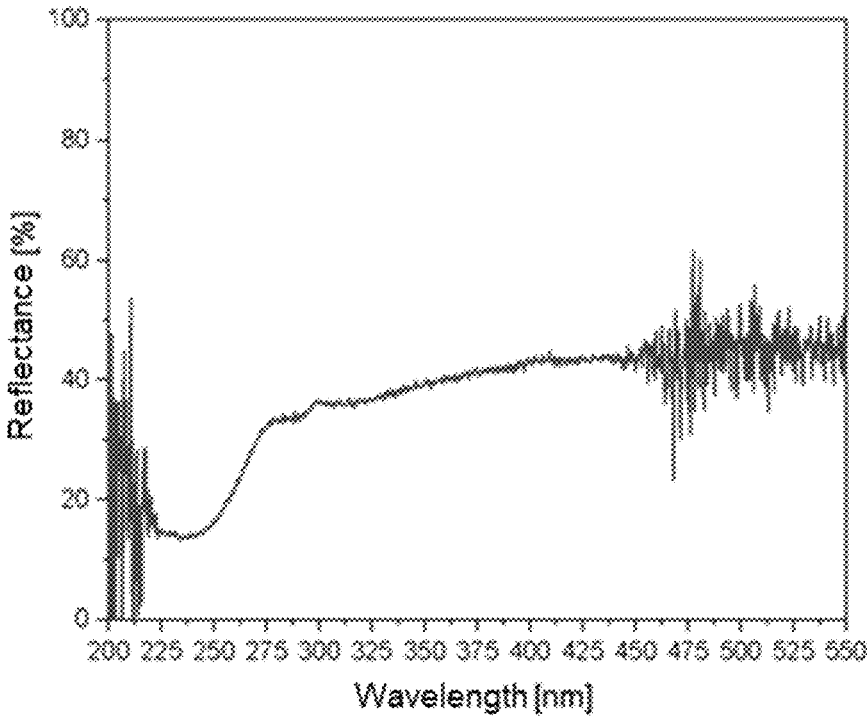
FIG. 9 illustrates a reflectance spectrum of a sample of $SiO_2$—$ZrO_2$—$Er^{3+}$ glass ceramic nanocrystals of the present invention.
Figure 10:
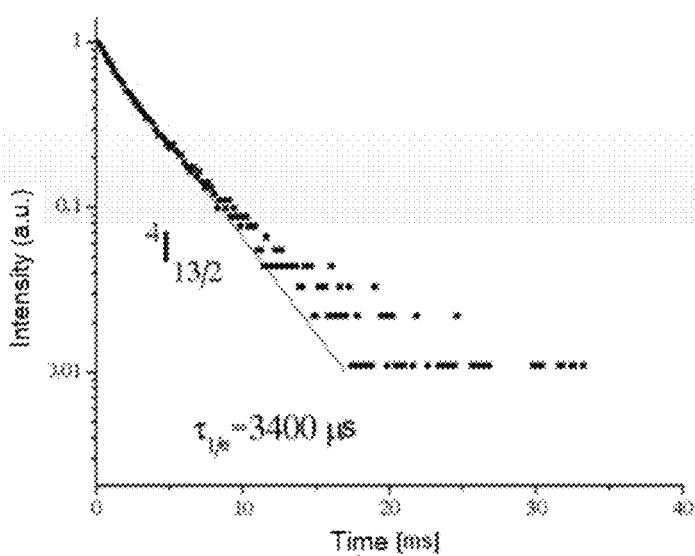
FIG. 10 illustrates the lifetime patterns of a sample of $SiO_2$—$ZrO_2$—$Er^{3+}$ glass ceramic nanocrystals of the present invention.

In this sense, in order to confirm that the $SiO_2$—$ZrO_2$ (undoped) can be useful for the application presented in FIG. 6, a light reflection test represented in FIG. 9 was performed using an OCEAN OPTICS Flame-S-XR1-ES Spectrometer. The results illustrated in FIG. 9 confirm that the material tends to have an absorption of light in the wavelengths that are required, this means that the light can reach the doped layer and enable acquisition of information on energy stability. Therefore, it is apparent that the photoluminescent glass ceramic nanocrystals according to the present invention enable excitation not only with visible radiation at 588 nm, but also at other wavelengths. Additionally, FIG. 10 illustrates the calculation of the lifetime of the emission of Er ($^4I_{13/2}$) corresponding to 3400 μs, a value that must be taken into account in the tests. In addition, no phase transitions between the temperatures of 0° C. and 1,400° C. were observed, which means that the photoluminescent glass ceramic nanocrystals according to the present invention exhibit stabilization of the tetragonal phase thereof at room temperature.

Regarding the appearance of the nanocrystals, they have a particle size of approximately 10 nm as represented in FIG. 11. In this figure, the transmission emission microscopy (TEM) images of three samples are presented wherein one of them (FIG. 11-a) is only $ZrO_2$ doped with Er, then $SiO_2$—$ZrO_2$ (FIG. 11-b) without the doping material, and finally Er-doped $SiO_2$—$ZrO_2$ images (FIG. 11-c).

Finally, the size of the crystallites was calculated from the X-Ray Diffraction results. These results are presented in FIG. 12, which are consistent with the TEM results obtained (FIG. 11).

ADVANTAGES AND BENEFITS OF THE PRESENT INVENTION

The advantage of the process and the photoluminescent glass ceramic nanocrystals based on silica-stabilized zirconia doped with erbium is exhibited in the optical properties of this new nanostructured material complemented with good thermal behavior, typical of a Zirconia stabilized at room temperature. The optical properties enhance the material so that it becomes, in addition to a thermal barrier, a sensor enabling sensitivity to thermal variables and morphological characteristics of the coating.

The present invention may be useful for the diagnosis of operational variables in closed thermal systems, where the use of conventional monitoring techniques is not possible. For example, applications in boilers or interiors of commercial thermal systems which can only be reached with a probe. Another advantage is that the material in the form of photoluminescent glass ceramic nanocrystals according to the present invention can be deposited internally in the thermal system and enable in some way diagnosing variable operations, such as surface temperature, without the use of electrical cables, by merely inserting an optical fiber, which involves a few millimeters in the design of the equipment.

The invention claimed is:

1. A process for the preparation of photoluminescent glass ceramic nanocrystals based on silica-stabilized zirconia, characterized by the process comprising the following steps:
   a) preparing a precursor of $SiO_2$ (tetraethoxysilane TEOS); solution) by mixing tetraethyl orthosilicate with a primary alcohol in a ratio of tetraethyl orthosilicate: alcohol 0.1:15.5 with constant stirring for 1 hour and adding distilled water in a ratio of tetraethyl orthosilicate: water 0.1:2.8 for two hours and subsequently adding an inorganic acid selected from $HNO_3$ or HCl and water in a mixing ratio of tetraethyl orthosilicate: acid: water of 0.1:0.0005:2.8 with constant stirring for 1 hour at room temperature and atmospheric pressure to obtain a TEOS solution;
   b) preparing a $ZrO_2$ solution by taking a zirconium ($Zr^{+4}$) solution and adding ethyl alcohol and inorganic acid selected from $HNO_3$ and HCl in a ratio of zirconium solution: ethyl alcohol: acid of 0.9:24.5:1.8 and stirring at room temperature and atmospheric pressure for a period of 1 hour;
   c) mixing the TEOS solution obtained in step a) and the $ZrO_2$ solution obtained in step b) to form a $SiO_2$—$ZrO_2$ mixture, wherein the molar ratio of $SiO_2$: $ZrO_2$ is 10:90;
   d) adding a mixture of Erbium in $HNO_3$ solution in a ratio of 1% to the $SiO_2$-$ZrO_2$ mixture to obtain an Erbium mixture;

e) agitating the Erbium mixture obtained in step d) for a period of 10 to 20 hours;

f) depositing the Erbium mixture in a platinum crucible or a container made of platinum suitable for high-temperature thermal treatment; and g) thermally treating the Erbium mixture in the platinum crucible-type container with a heating profile wherein the temperature is increased from room temperature to 900° C. at a rate of 18 to 20° C./minute.

2. The process for the preparation of photoluminescent glass ceramic nanocrystals based on silica-stabilized zirconia according to claim 1, wherein in step c) the TEOS solution obtained in step a) is added drop by drop to the $ZrO_2$ solution prepared in step b), and water is also added with constant stirring for 3 hours at normal conditions of temperature and pressure.

3. The process for the preparation of photoluminescent glass ceramic nanocrystals based on silica-stabilized zirconia according to claim 1, wherein in step g) the heating profile is carried out by increasing the temperature from room temperature to 900° C. at a rate of 19.2° C./minute over a period of 0.5 to 0.8 hours, and once the temperature of 900° C. is reached, said temperature is maintained for a period of 1 to 2.5 hours, after which the temperature is decreased from 900° C. to 575° C. at a rate of 4 to 5° C./minute over a period of 0.9 to 1.5 hours and the temperature of 575° C. is then maintained for a period from 0.5 to 1.0 hours and after this time, the temperature is decreased to 500° C. at a rate equal to 4 to 5° C./minute over a period of 0.1 to 0.5 hours, and the temperature at 500° C. is maintained for a period of 2 to 4 hours, after which the temperature is increased to 550° C. at a rate of 3 to 4° C./minute for a period of 0.2 to 0.4 hours, and said temperature is maintained for a period of 1 to 3 hours and the thermal treatment is carried out in a total of 10 to 12 hours.

4. Photoluminescent glass ceramic nanocrystals based on silica-stabilized zirconia obtained through a process that contains the following steps:

a preparing a precursor of $SiO_2$ (tetraethoxysilane TEOS solution) by mixing tetraethyl orthosilicate with a primary alcohol in a ratio of tetraethyl orthosilicate: alcohol 0.1:15.5 with constant stirring for 1 hour and adding distilled water in a ratio of tetraethyl orthosilicate: water 0.1:2.8 for two hours and subsequently adding an inorganic acid selected from $HNO_3$ or HCl and water in a mixing ratio of tetraethyl orthosilicate: acid: water of 0.1:0.0005:2.8 with constant stirring for 1 hour at room temperature and atmospheric pressure to obtain a TEOS solution;

b) preparing a $ZrO_2$ solution by taking a zirconium ($Zr^{+4}$) solution and adding ethyl alcohol and inorganic acid selected from $HNO_3$ and HCl in a ratio of zirconium solution: ethyl alcohol: acid of 0.9:24.5:1.8 and stirring at room temperature and atmospheric pressure for a period of 1 hour;

c) mixing the TEOS solution obtained in step a) and the $ZrO_2$ solution obtained in step b) to form a $SiO_2$—$ZrO_2$ mixture, wherein the molar ratio of $SiO_2$:$ZrO_2$ is 10:90;

d) adding to a mixture of Erbium in $HNO_3$ solution in a ratio of 1% to the $SiO_2$—$ZrO_2$ mixture to obtain an Erbium mixture;

e) agitating the Erbium mixture obtained in step d) for a period of 10 to 20 hours;

f) depositing the Erbium mixture in a platinum crucible or a container made of platinum suitable for high-temperature thermal treatment; and g) thermally treating the mixture from step f) with a heating profile wherein the temperature is increased from room temperature to 900° C. at a rate of 18 to 20° C./minute;

wherein said nanocrystals are characterized in that the X-ray diffraction pattern thereof presents with bands 2θ at 30.1, 34.6, 35.1, 42.9, 50.1, 50.5, 59.3, 60.0, 73.0, 74.3, 82.2 and 84.9 and where the nanocrystals have sizes between 7.5 and 12.5 nanometers.

* * * * *